UNITED STATES PATENT OFFICE.

CHARLES A. GOLDSMITH, OF YORK, PENNSYLVANIA.

COMPOSITION OF MATTER.

No. 923,641.  Specification of Letters Patent.  Patented June 1, 1909.

Application filed March 17, 1909. Serial No. 483,979.

*To all whom it may concern:*

Be it known that I, CHARLES A. GOLDSMITH, a citizen of the United States, and a resident of York, in the county of York and State of Pennsylvania, have made certain new and useful Improvements in Composition of Matter, of which the following is a specification.

This invention is a composition of matter designed for use in the treatment of smoking tobacco, and tobacco for use in making cigars, and has for an object to provide a liquid for treating the tobacco for removing therefrom the musty odor and cellar smells and other foreign odors sometimes found in tobacco.

My composition consists of the following ingredients, combined in about the proportions stated, permanganate of potash two ounces, extract of coffee, two ounces, extract of licorice, two ounces, common salt, one-half ounce, water, substantially pure, nine and one-half ounces. These ingredients are mixed by agitation and the tobacco to be treated is cased or dipped in the liquid or the liquid is sprayed on the tobacco according to the condition thereof.

In some cases the composition can be diluted by the addition of more water, sometimes, four times the quantity above indicated, or it can be increased in strength by reducing the quantity of water, some tobacco requiring a stronger treatment than others and I, therefore, do not desire to be limited to any particular strength of the solution.

By the use of the above described composition the musty, cellar and other objectionable odors will be removed and the tobacco left in condition for use as desired.

I claim—

1. The composition of matter herein described consisting of permanganate of potash extract of coffee, extract of licorice, salt, and water substantially as described and for the purpose specified.

2. The herein described composition of matter for use in the treatment of tobacco consisting of permanganate of potash, two ounces, extract of coffee two ounces, extract of licorice two ounces, salt one-half ounce, and water nine and one-half ounces, all substantially as described.

CHARLES A. GOLDSMITH.

Witnesses:
SOLON C. KEMON,
PERRY B. TURPIN.